United States Patent [19]

Theus

[11] Patent Number: 4,481,549
[45] Date of Patent: * Nov. 6, 1984

[54] MFM DATA ENCODER WITH WRITE PRECOMPENSATION

[75] Inventor: John G. Theus, Tigard, Oreg.

[73] Assignee: Tektronix, Inc., Beaverton, Oreg.

[*] Notice: The portion of the term of this patent subsequent to Jun. 8, 1999 has been disclaimed.

[21] Appl. No.: 219,048

[22] Filed: Dec. 22, 1980

Related U.S. Application Data

[63] Continuation of Ser. No. 74,600, Sep. 12, 1979, Pat. No. 4,334,250, which is a continuation of Ser. No. 887,403, Mar. 16, 1978, abandoned.

[51] Int. Cl.³ ............................................. G11B 5/09
[52] U.S. Cl. ...................................... 360/45; 360/40; 360/43
[58] Field of Search ................. 360/45, 43, 40, 48, 360/51

[56] References Cited

U.S. PATENT DOCUMENTS

| 3,067,422 | 12/1962 | Hunt | 36/45 |
| 3,159,840 | 12/1964 | Woo | 346/74 |
| 3,560,947 | 2/1971 | Franchini | 340/174.1 |
| 3,879,342 | 4/1975 | Patel | 360/45 |
| 4,000,512 | 12/1976 | Lau | 360/45 |
| 4,000,513 | 12/1976 | Precourt | 360/45 |
| 4,173,027 | 10/1979 | Rathburm | 360/45 |

FOREIGN PATENT DOCUMENTS

| 1137572 | 12/1968 | United Kingdom | 310/45 |
| 1354744 | 5/1974 | United Kingdom | 360/45 |
| 1397317 | 6/1975 | United Kingdom | 360/45 |
| 2006489 | 5/1979 | United Kingdom | 360/45 |

OTHER PUBLICATIONS

IBM TDB vol. 17 #5, pp. 1489–1491 "Translator for Run Length Limited Code" M. Miessler.

*Primary Examiner*—Vincent P. Canney
*Attorney, Agent, or Firm*—Thomas J. Spence; John D. Winkelman

[57] ABSTRACT

A circuit is provided for encoding digital data to be recorded on high-density magnetic storage media. The circuit converts serial data to modified phase modulation encoded serial data with time encoding or write precompensation.

8 Claims, 3 Drawing Figures

MFM DATA ENCODER WITH WRITE PRECOMPENSATION

This is a continuation of application Ser. No. 74,600, filed Sept. 12, 1979 and issued June 8, 1982 as U.S. Pat. No. 4,334,250, which application was a continuation of application Ser. No. 887,403, filed Mar. 16, 1978 and now abandoned.

BACKGROUND OF THE INVENTION

When digital information is recorded on high-density magnetic recording media (tape, disk, etc.) it must be encoded in such a manner as to be reliably played back. Various encoding techniques have been developed and are well known to those skilled in the art. One of the more efficient encoding methods is modified phase modulation, also known as MFM. Hereinafter, this encoding method will be referred to as MFM encoding. MFM encoding is usually implemented by employing a variety of random logic devices.

Further, when digital information is recorded on a magnetic disk, bit shifting can occur as recorded flux reversals more from denser toward less dense regions of the track. Movement is apparent, not real; it is actually a time displacement caused by characteristics of the magnetic medium. A technique known as write precompensation has been developed, and is well known by those skilled in the art, which counteracts this read data bit shift with an equivalent, but opposite, time shift on the write bit data stream. Write precompensation is usually implemented by using analog or digital delays.

SUMMARY OF THE INVENTION

The present invention is an electronic circuit for performing MFM encoding and write precompensation in one step. It eliminates the need for analog or digital delay lines and greatly reduces the number of electronic components required.

In the present invention, data encoded according to the MFM encoding algorithm and the write precompensation encoding algorithm is stored in a read-only memory (ROM). In order to determine the output of the encoder circuit, the bit to be encoded, the previous two encoded bits, and the next bit to be encoded are examined. This is done with a serial-to-parallel shift register. The four output lines of the shift register are used to address the specific locations in the ROM wherein the properly encoded data bit is stored. A fifth address line to the ROM accesses the encoded data that has been write precompensated when write precompensation is required.

The encoded data bits stored in the ROM are each composed of eight equal time sections. Four sections represent a logical one and four represent a logical zero. Which of the four sections the data bit is in is determined by the write precompensation algorithm. The eight time sections are read out of the memory in parallel form and converted back to a serial bit stream.

It is therefore the object of the present invention to provide a simple and novel circuit to convert a serial bit stream into a serial bit stream with MFM encoding and write precompensation encoding.

Other objects and advantages will become apparent to those having ordinary skill in the art upon a reading of the following description when taken in conjunction with the accompanying drawings.

DETAILED DESCRIPTION OF THE INVENTION

Figure 1:
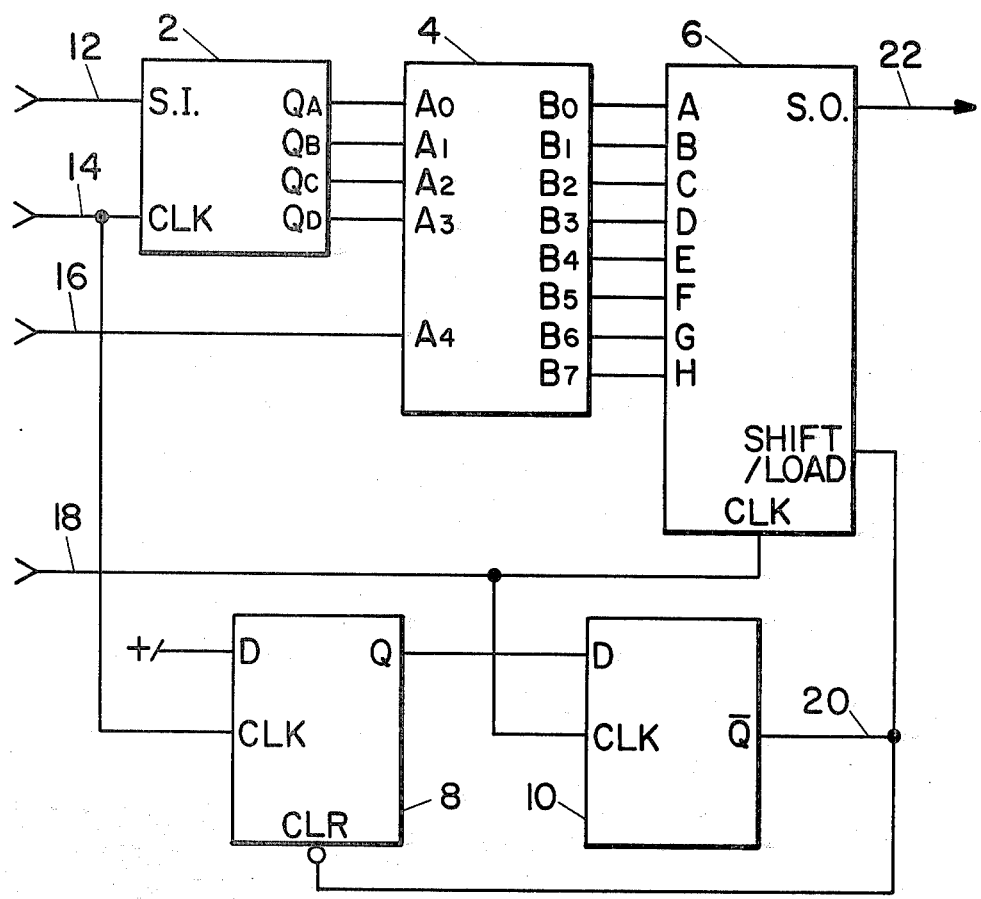
FIG. 1 is a schematic of the preferred embodiment of the present invention.

Turning now to the drawings, shown in FIG. 1 is a preferred embodiment of the present invention. Shown are a 4-bit serial-to-parallel shift register 2, a 256-bit read-only memory (ROM) 4, an 8-bit parallel-to-serial shift register 6, and D-type flip-flops 8 and 10. This circuit receives, at input line 12, the stream of serial bits to be encoded and outputs the encoded data at output line 22.

The present invention converts each bit of digital information into MFM code. It is well known to those skilled in the art that the MFM encoding process may be described as follows:

an output pulse is generated for each input bit that is a logical one; however, an output pulse is generated for an input bit that is a logical zero only when the previous input bit was also a zero.

Figure 2:
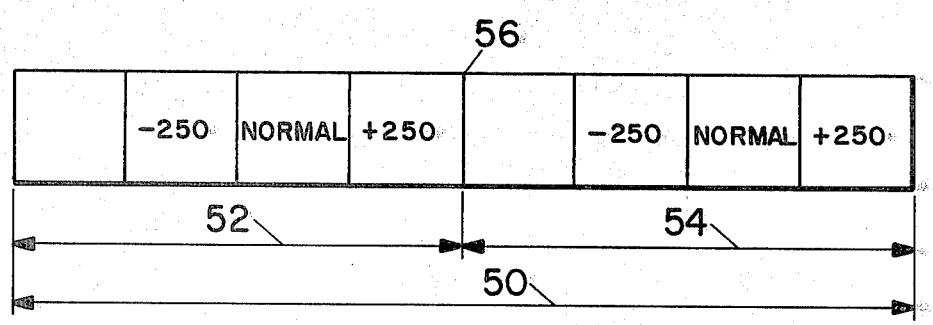
FIG. 2 illustrates the various parts of an encoded data bit.

Each encoded output bit interval 50 as shown in FIG. 2 is divided into two half-bit intervals 52 and 54. A pulse in half-bit interval 52 represents a logical zero output bit and a pulse in half-bit interval 54 represents a logical one output bit.

The present invention further divides each half-bit interval into four time sections 56 each representing 250 nanoseconds. Thus, the encoded output bit interval is divided into eight 250-nanosecond time intervals. These eight time intervals are used to encode the write precompensation information. When a pulse representing a logical one or zero bit is placed in the time section labeled NORMAL, the encoded bit is not write precompensated. However, when the pulse is placed in the time section labeled -250 the encoded bit is precompensated by -250 nanoseconds. That is, it occurs 250 nanoseconds earlier than a normal encoded bit representing the same information will occur. When the pulse is placed in the time section labeled +250 the encoded bit is precompensated by +250 nanoseconds or delayed by 250 nanoseconds.

When determining whether write precompensation is required on the inner tracks of a magnetic disk, it is necessary to examine the bit to be encoded, the two previously encoded bits, and the next bit to be encoded. This is necessary because, as is well known to those skilled in the art, only certain combinations of bias require precompensation when they are written on the inner tracks. The bit patterns requiring precompensation and the amount of precompensation required are listed below.

| BIT PATTERN | | | | AMOUNT OF |
| D | C | B | A | COMPENSATION |
| --- | --- | --- | --- | --- |
| 0 | 0 | 0 | 1 | −250 nanoseconds |
| 0 | 1 | 1 | 0 | −250 nanoseconds |
| 1 | 1 | 1 | 0 | −250 nanoseconds |
| 0 | 0 | 1 | 1 | +250 nanoseconds |
| 1 | 0 | 1 | 1 | +250 nanoseconds |

-continued

| BIT PATTERN | | | | AMOUNT OF |
|---|---|---|---|---|
| D | C | B | A | COMPENSATION |
| 1 | 0 | 0 | 0 | +250 nanoseconds | where:
bit A is the next bit to be encoded;
bit B is the bit to be encoded; and
bits C and D are the two previously encoded bits.

Figure 3:
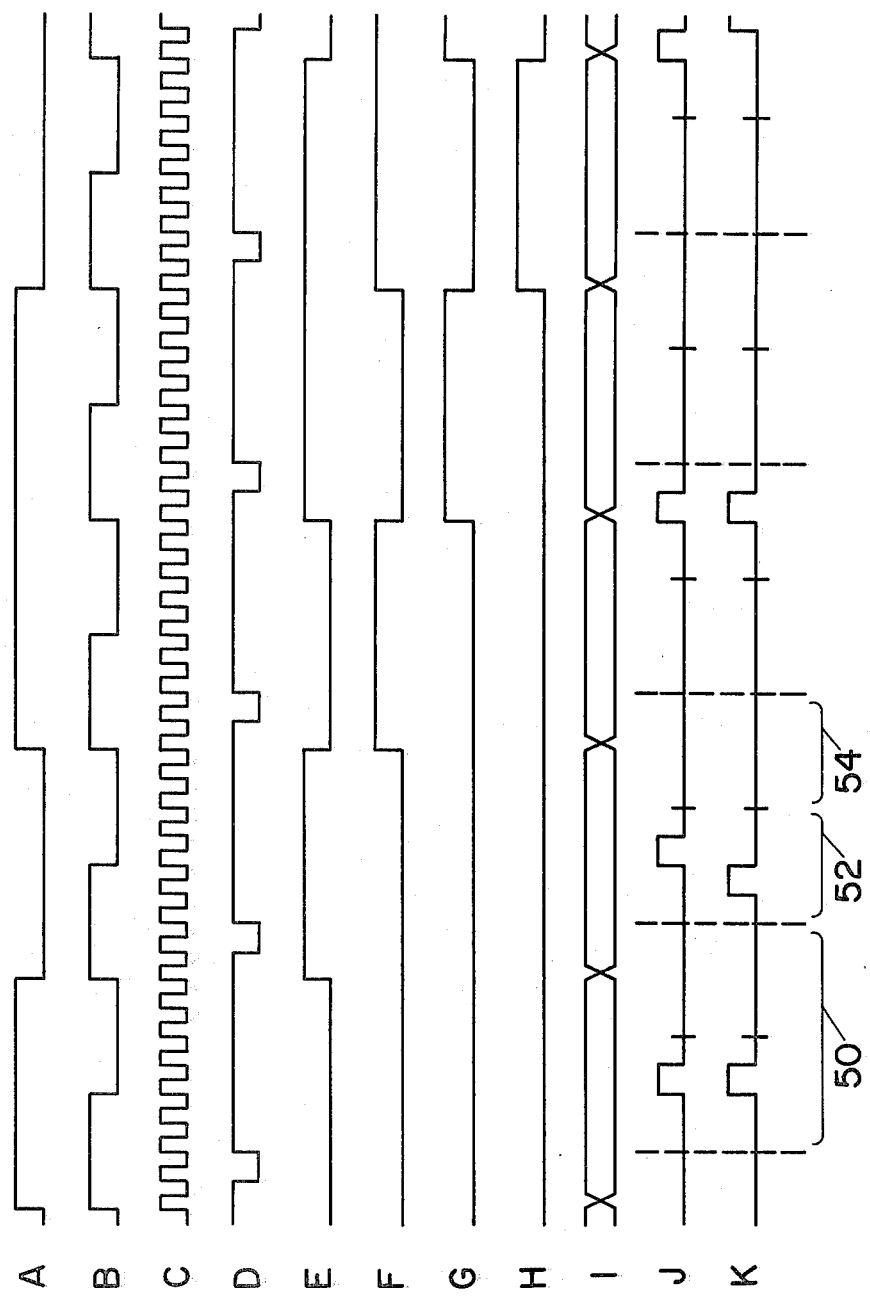
FIG. 3 is a timing diagram to aid in understanding the operation of the circuit shown in FIG. 1.

The operation of the present invention can best be understood by referring to the schematic diagram of FIG. 1 and the timing diagram of FIG. 3.

The 4-bit serial-to-parallel shift register 2 receives a serial bit stream, shown as signal A in the timing diagram, on input line 12 and subsequently converts it to a parallel 4-bit pattern. Input line 12 is connected to the serial data input of shift register 2. Shift register 2 may suitably be a commercially available 74LS164 shift register. The serially-received bits are shifted through shift register 2 by the data clock, shown as signal B in the timing diagram, on input line 14 which is connected to the clock input thereof. The frequency of data clock B is typically 500 kilohertz. The data clock is also connected to the clock input of flip-flop 8. Each low-to-high transition of the data clock shifts the input bits one position to the right. The output of each stage of shift register 2 is available. Output $Q_B$, signal F in the timing diagram, represents the bit to be encoded. Output $Q_A$, signal E in the timing diagram, represents the next bit to be encoded and outputs $Q_C$ and $Q_D$, signals G and H in the timing diagram, represent the two previously encoded bits.

Shift register 2 outputs $Q_A$, $Q_B$, $Q_C$, and $Q_D$ are connected to ROM 4 via its address lines $A_0$, $A_1$, $A_2$, and $A_3$, respectively. Thus, the shift register outputs address the contents of the ROM. Input line 16 carries an external on/off control signal for the write precompensation algorithm and is connected to the fifth address line of ROM 4, $A_4$.

ROM 4 is a 256-bit ROM organized as 32 8-bit words. ROM 4 may suitably be a commercially available 74S288 ROM. Stored in this ROM are the bit patterns that correspond to the MFM encoded and write precompensated equivalents of the input serial data bits. ROM 4 is used to create an output word from an input word. The input word (address) created by shift register 2 is decoded by circuitry internal to the ROM and the corresponding output word is placed on output lines $B_0$–$B_7$, signal I in the timing diagram. The output word from ROM 4, and its corresponding input word, for the 32 storage locations therein are listed in the table below.

| AD- | INPUT WORD | | | | | OUTPUT WORD | | | | | | | |
|---|---|---|---|---|---|---|---|---|---|---|---|---|---|
| DRESS | $A_4$ | $A_3$ | $A_2$ | $A_1$ | $A_0$ | $B_7$ | $B_6$ | $B_5$ | $B_4$ | $B_3$ | $B_2$ | $B_1$ | $B_0$ |
| 0 | 0 | 0 | 0 | 0 | 0 | 0 | 0 | 1 | 0 | 0 | 0 | 0 | 0 |
| 1 | 0 | 0 | 0 | 0 | 1 | 0 | 1 | 0 | 0 | 0 | 0 | 0 | 0 |
| 2 | 0 | 0 | 0 | 1 | 0 | 0 | 0 | 0 | 0 | 0 | 0 | 1 | 0 |
| 3 | 0 | 0 | 0 | 1 | 1 | 0 | 0 | 0 | 0 | 0 | 0 | 0 | 1 |
| 4 | 0 | 0 | 1 | 0 | 0 | 0 | 0 | 0 | 0 | 0 | 0 | 0 | 0 |
| 5 | 0 | 0 | 1 | 0 | 1 | 0 | 0 | 0 | 0 | 0 | 0 | 0 | 0 |
| 6 | 0 | 0 | 1 | 1 | 0 | 0 | 0 | 0 | 0 | 0 | 1 | 0 | 0 |
| 7 | 0 | 0 | 1 | 1 | 1 | 0 | 0 | 0 | 0 | 0 | 0 | 1 | 0 |
| 8 | 0 | 1 | 0 | 0 | 0 | 0 | 0 | 0 | 1 | 0 | 0 | 0 | 0 |
| 9 | 0 | 1 | 0 | 0 | 1 | 0 | 0 | 1 | 0 | 0 | 0 | 0 | 0 |
| 10 | 0 | 1 | 0 | 1 | 0 | 0 | 0 | 0 | 0 | 0 | 0 | 1 | 0 |
| 11 | 0 | 1 | 0 | 1 | 1 | 0 | 0 | 0 | 0 | 0 | 0 | 0 | 1 |
| 12 | 0 | 1 | 1 | 0 | 0 | 0 | 0 | 0 | 0 | 0 | 0 | 0 | 0 |
| 13 | 0 | 1 | 1 | 0 | 1 | 0 | 0 | 0 | 0 | 0 | 0 | 0 | 0 |
| 14 | 0 | 1 | 1 | 1 | 0 | 0 | 0 | 0 | 0 | 1 | 0 | 0 | 0 |
| 15 | 0 | 1 | 1 | 1 | 1 | 0 | 0 | 0 | 0 | 0 | 0 | 1 | 0 |
| 16 | 1 | 0 | 0 | 0 | 0 | 0 | 0 | 1 | 0 | 0 | 0 | 0 | 0 |
| 17 | 1 | 0 | 0 | 0 | 1 | 0 | 0 | 1 | 0 | 0 | 0 | 0 | 0 |
| 18 | 1 | 0 | 0 | 1 | 0 | 0 | 0 | 0 | 0 | 0 | 0 | 1 | 0 |
| 19 | 1 | 0 | 0 | 1 | 1 | 0 | 0 | 0 | 0 | 0 | 0 | 1 | 0 |
| 20 | 1 | 0 | 1 | 0 | 0 | 0 | 0 | 0 | 0 | 0 | 0 | 0 | 0 |
| 21 | 1 | 0 | 1 | 0 | 1 | 0 | 0 | 0 | 0 | 0 | 0 | 0 | 0 |
| 22 | 1 | 0 | 1 | 1 | 0 | 0 | 0 | 0 | 0 | 0 | 0 | 1 | 0 |
| 23 | 1 | 0 | 1 | 1 | 1 | 0 | 0 | 0 | 0 | 0 | 0 | 1 | 0 |
| 24 | 1 | 1 | 0 | 0 | 0 | 0 | 0 | 1 | 0 | 0 | 0 | 0 | 0 |
| 25 | 1 | 1 | 0 | 0 | 1 | 0 | 0 | 1 | 0 | 0 | 0 | 0 | 0 |
| 26 | 1 | 1 | 0 | 1 | 0 | 0 | 0 | 0 | 0 | 0 | 0 | 1 | 0 |
| 27 | 1 | 1 | 0 | 1 | 1 | 0 | 0 | 0 | 0 | 0 | 0 | 1 | 0 |
| 28 | 1 | 1 | 1 | 0 | 0 | 0 | 0 | 0 | 0 | 0 | 0 | 0 | 0 |
| 29 | 1 | 1 | 1 | 0 | 1 | 0 | 0 | 0 | 0 | 0 | 0 | 0 | 0 |
| 30 | 1 | 1 | 1 | 1 | 0 | 0 | 0 | 0 | 0 | 0 | 0 | 1 | 0 |
| 31 | 1 | 1 | 1 | 1 | 1 | 0 | 0 | 0 | 0 | 0 | 0 | 1 | 0 |

Addresses 0–15 contain bits encoded according to both the MFM and the write precompensation algorithms while addresses 16–31 contain bits encoded according to only the MFM algorithm. As can be seen from the above table, write precompensation encoding is selected when the signal at address input $A_4$ is a logical zero.

Parallel-to-serial shift register 6 receives the encoded 8-bit output words from ROM 4 outputs $B_0$–$B_7$ in parallel form at its input terminals A–H. Shift register 6 converts these parallel inputs to a serial output and may be a commercially available 74LS166 shift register. Shift register 6 is clocked by the shift/load clock, shown as signal C in the timing diagram, on input line 18 which is connected to the clock input thereof. The frequency of this clock is eight times that of the data clock. The shift/load clock is also connected to the clock input of flip-flop 10. Loading of data into shift register 6 is controlled by D-type flip-flops 8 and 10.

As mentioned above, flip-flop 10 is clocked by the shift/load clock while flip-flop 8 is clocked by the data clock. The high logic level (one) connected to the D input of flip-flop 8 is transferred to its Q output at the low-to-high transition of the data clock. The Q output of flip-flop 8 is connected to the D input of flip-flop 10. The complement of the logic level at the D input of flip-flop 10 is transferred to its $\bar{Q}$ output at the low-to-high transition of the shift/load clock. This $\bar{Q}$ output is connected to the clear input of flip-flop 8 and the shift/load input of shift register 6. The resulting shift/load control signal on line 20 is shown as signal D in the timing diagram. The control signal consists of a negative-going pulse equal in period to the period of one shift/load clock pulse occurring at a repetition rate equal to the repetition rate of the data clock.

The shift/load control signal is applied to the shift/load input of shift register 6. When this signal is low, parallel data inputs A–H are enabled and the 8-bit word on output lines $B_0$–$B_7$ is loaded into shift register 6 are the next low-to-high transition of the shift/load clock. When the shift/load control signal is high, parallel inputs A–H are inhibited and the contents of the shift register are shifted one position to the right with each low-to-high transition of the shift/load clock. The result is the desired encoded serial bit stream at output line 22. The encoded serial bit stream is shown as signals J and K in the timing diagram. Signal K is the result of the same serial input bits as signal 3, but signal K includes write precompensation.

While there has been shown and described the preferred embodiment of the present invention, it will be apparent to those skilled in the art that many changes and modifications may be made without departing from the invention in its broader aspects. Therefore, the appended claims are intended to cover all such modifications and changes that fall within the true spirit and scope of the invention.

The invention is claimed in accordance with the following:

1. An encoding circuit for converting an input stream of serial data bits to an MFM encoded output stream of serial data bits with write precompensation; said encoding circuit comprising:
   means for converting the input stream of serial data bits to parallel bits;
   memory means for storing therein addressable data words from which said encoded output is to be formed, each said data word representing an input bit in MFM encoding and at least one of said data words additionally including write precompensation encoding, the input of said memory means being coupled to said converting means whereby said data words are addressable by said parallel data bits;
   said memory means being arranged such that for each parallel data bit a said data word representing it is made available at the output of said memory means, said word being selectable from those which include precompensation encoding when the context of said parallel data bit so requires;
   means coupled to the output of said memory means for converting said addressable data words from parallel to serial form providing the output stream of serial data bits; and
   means for controlling the transfer of said addressable data words from said memory means to said parallel-to-serial converter means.

2. The encoding circuit according to claim 1 wherein said memory means comprises a ROM for storing a plurality of data words.

3. The encoding circuit according to claim 1 wherein said serial-to-parallel converting means comprises a serial-input, parallel-output shift register.

4. The encoding circuit according to claim 1 wherein said parallel-to-serial converting means comprises a parallel-input, serial-output shift register.

5. The encoding circuit according to claim 1 wherein said transfer control means comprises D-type flip-flops.

6. The encoding circuit of claim 1 further comprising means for selecting said write precompensation encoding.

7. An encoding circuit for converting an input stream of serial data bits to an MFM encoded output stream of serial data bits with write precompensation; said encoding circuit comprising:
   a serial-input, parallel-output shift register for converting the input stream of serial data bits to parallel bits;
   a read-only memory for storing therein addressable data words from which said encoded output is to be formed, each said data word representing an input bit in MFM encoding and at least one of said data words additionally including write precompensation encoding, the input of said read-only memory being coupled to said serial-input, parallel-output shift register whereby said data words are addressable by said parallel data bits;
   said read-only memory being arranged such that for each parallel data bit a said data word representing it is made available at the output of said read-only memory, said word being selectable from those which include precompensation encoding when the context of said parallel data bit so requires;
   a parallel-input, serial-output shift register coupled to the output of said read-only memory for converting said addressable data words from parallel to serial form providing the output stream of serial data bits; and
   means for controlling the transfer of said addressable data words from said read-only memory to said parallel-input, serial-output shift register.

8. A circuit for performing MFM encoding and write precompensation on a serial bit stream, said circuit comprising:
   means for receiving an input serial bit stream;
   means for forming selected bits of said input stream into a first parallel data word;
   memory means responsive to said first data word for producing a second parallel data word representative of a particular bit of said input data stream modified so as to incorporate both MFM encoding and write precompensation;
   means for converting said second data word into an output bit stream having an effective bit rate equal to that of said input stream.

* * * * *